United States Patent
Mariotti et al.

(10) Patent No.: US 11,879,545 B2
(45) Date of Patent: Jan. 23, 2024

(54) PARKING BRAKE FOR A MOTOR VEHICLE AND MOTOR VEHICLE COMPRISING THE PARKING BRAKE

(71) Applicant: PIAGGIO & C. S.P.A., Pontedera (IT)

(72) Inventors: Walter Mariotti, Pontedera (IT); Marcello Fiaccavento, Pontedera (IT); Carlo Magagnini, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 17/908,952

(22) PCT Filed: Feb. 26, 2021

(86) PCT No.: PCT/IB2021/051615
§ 371 (c)(1),
(2) Date: Sep. 2, 2022

(87) PCT Pub. No.: WO2021/176314
PCT Pub. Date: Sep. 10, 2021

(65) Prior Publication Data
US 2023/0087985 A1 Mar. 23, 2023

(30) Foreign Application Priority Data
Mar. 3, 2020 (IT) .................. 102020000004459

(51) Int. Cl.
*F16H 63/34* (2006.01)
*B62D 63/04* (2006.01)

(52) U.S. Cl.
CPC ......... *F16H 63/3416* (2013.01); *B62D 63/04* (2013.01)

(58) Field of Classification Search
CPC ..... F16H 63/3416; B62D 63/04; B60T 1/005; B60T 1/062; F16D 63/006
See application file for complete search history.

(56) References Cited

U.S. PATENT DOCUMENTS

| | | | |
|---|---|---|---|
| 4,519,483 A * | 5/1985 | Schlicker | F16H 63/3416 192/219.5 |
| 5,704,457 A * | 1/1998 | Kimura | B60K 37/06 192/220.2 |
| 6,124,789 A * | 9/2000 | Barr | B60Q 9/001 340/456 |
| 6,199,442 B1 * | 3/2001 | Bauer | E02F 9/121 212/292 |
| 8,888,630 B2 * | 11/2014 | Makita | F16H 55/30 474/48 |

(Continued)

FOREIGN PATENT DOCUMENTS

| | | |
|---|---|---|
| DE | 102020108141 A1 * | 9/2021 |
| JP | 2016223489 A | 12/2016 |
| WO | 2015040600 A2 | 3/2015 |

*Primary Examiner* — Drew J Brown
(74) *Attorney, Agent, or Firm* — McGlew and Tuttle, P.C.

(57) ABSTRACT

A parking brake includes an inhibitor device (31), which can be associated with a drive shaft (3) for rotating therewith, the inhibitor device (31) being actuated by centrifugal force. The parking brake further includes a locking member (33) adapted to engage the inhibitor device (31) when actuated. The inhibitor device (31) is configured to prevent the engagement of the locking member with the inhibitor device when the inhibitor device rotates at a speed greater than a minimum speed, so as to prevent the application of the parking brake.

17 Claims, 15 Drawing Sheets

(56) References Cited

U.S. PATENT DOCUMENTS

| | | | |
|---|---|---|---|
| 11,402,019 B2* | 8/2022 | Gebert | F16H 63/3425 |
| 2002/0040839 A1 | 4/2002 | Thyselius | |
| 2003/0042084 A1* | 3/2003 | Kawase | F16D 55/00 |
| | | | 188/72.1 |
| 2006/0131113 A1* | 6/2006 | Christof | B60T 8/00 |
| | | | 188/72.1 |
| 2008/0121489 A1 | 5/2008 | Chevalier | |
| 2018/0106315 A1 | 4/2018 | Chelaidite et al. | |
| 2019/0173358 A1* | 6/2019 | Ishikawa | H02K 9/19 |
| 2021/0381198 A1* | 12/2021 | Naito | F16D 55/38 |

* cited by examiner

PARKING BRAKE FOR A MOTOR VEHICLE AND MOTOR VEHICLE COMPRISING THE PARKING BRAKE

TECHNICAL FIELD

The present invention relates to improvements to motor vehicle components, in particular two- or three-wheeled motor vehicles, for example saddle-type vehicles with a rear drive wheel and a front steered wheel, or vehicles with two rear drive wheels and a front steered wheel. It cannot be ruled out that the innovations described herein be applicable to vehicles with a rear drive wheel and two front steered wheels.

Embodiments disclosed herein in particular relate to improvements to parking brakes for motor vehicles, in particular two- or three-wheeled motor vehicles.

BACKGROUND ART

Four-wheel motor vehicles are provided with a parking brake, which blocks at least the drive wheels when the vehicle is stationary for greater safety. The parking brake is applied by hand. In some more modern high-end vehicles, the parking brake is automatically applied when the driver turns off the engine and unseats the key from the ignition.

Small motor vehicles, for example two- or three-wheeled motor vehicles, are not necessarily provided with a parking brake. However, it would be useful to provide these vehicles with a parking brake for greater safety, particularly in the case of three-wheel vehicles, with two rear drive wheels. The parking brake should be safe and cost-effective.

JP2016-223489 discloses a parking brake comprising a rotary circular body, keyed to a shaft which rotates when the vehicle on which the parking brake is mounted is in motion. The rotary circular body comprises perimetric toothing in which a locking member in the form of a harpoon engages. When the locking member is engaged in the perimetric toothing of the circular body, the rotation of the shaft on which the circular body is keyed is hindered. In order to prevent the engagement of the locking member when the vehicle is in motion, a radial pin slidable in a radial seat is inserted into each recess between two consecutive teeth of the perimetric toothing of the circular body. Each pin is associated with a respective spring, which holds the pin in a retracted position, so that it is drawn out with respect to the respective recess. When the circular body rotates, the centrifugal force acting on the pins overcomes the force of the spring and pushes the pins radially outwards so that the distal ends of the pins occupy the respective recess between adjacent teeth, hindering the locking member from engaging and thus preventing an application of the brake when the vehicle is in motion. This parking brake is very complicated and expensive, due to the large number of parts that it consists of. Furthermore, the centrifugal force and the force of the spring acting on each pin are radial and match the thrust exerted by the locking member. This makes the operation of the device very unsafe, given that if a sufficient force is exerted on the locking member, it can overcome the centrifugal force and push the pin radially inwards, locking the rotary shaft on which the cylindrical body is keyed, even if the vehicle is in motion and this poses a serious risk to the driver.

SUMMARY

According to an aspect, disclosed herein is a parking brake for motor vehicles, in particular but not exclusively two- or three-wheeled vehicles, which is safe, cost-effective and highly reliable, suitable both for use on vehicles with a single drive wheel and on vehicles with two drive wheels, possibly connected by a differential.

The parking brake comprises a locking member which can be actuated by means of a manual or servo-assisted actuator. The locking member is arranged to co-act with an inhibitor device, whose function is to allow the application of the parking brake when the vehicle is stationary or substantially stationary and to prevent the parking brake from being applied when the vehicle is in motion. To this end, the inhibitor device can be associated with a drive shaft to rotate therewith, and it is driven by means of centrifugal force. The locking member is adapted to engage, that is to mechanically engage, the inhibitor device when actuated; the inhibitor device is configured to prevent the engagement of the locking member with the inhibitor device when the inhibitor device rotates at a speed higher than a minimum speed so as to prevent the parking brake from being applied. When the inhibitor device is engaged with the locking member, the latter hinders the rotation of the inhibitor device and therefore of the shaft, to which the inhibitor device is associated.

Therefore, in summary, the parking brake generally comprises: an inhibitor device, which can be associated with a drive shaft to rotate therewith, the inhibitor device being actuated by means of centrifugal force; and a locking member adapted to engage the inhibitor device when actuated, the inhibitor device being configured to prevent the engagement of the locking member with the inhibitor device when the inhibitor device rotates at a speed higher than a minimum speed, so as to prevent the parking brake from being applied.

According to embodiments disclosed herein, the parking brake comprises an inhibitor device, which can be associated with a drive shaft for rotation therewith, and a locking member adapted to engage the inhibitor device. The inhibitor device is configured to pass from a first angular position, in which it hiders the engagement of the locking member when said drive shaft rotates at a rotation speed higher than a minimum speed, to a second angular position in which it allows the engagement of the locking member when said driving shaft rotates at a rotation speed lower than said minimum speed. The inhibitor device is actuated by means of a centrifugal force, correlated to said rotation speed.

Basically, if the centrifugal force is greater than a given value, it keeps the inhibitor device in the first angular position. In the absence of centrifugal force, or with a centrifugal force lower than the aforementioned value, the inhibitor device moves to the second angular position.

The centrifugal force can be opposed by an elastic force.

Therefore, in some embodiments, the inhibitor device may comprise a centrifugal mass and an opposing elastic member, tending to push the centrifugal mass into an inoperative position, the elastic force acting so as to oppose the centrifugal force.

In practical embodiments, the inhibitor device comprises a first disk which is fittable to the drive shaft, having a rotation axis and comprising a perimeter edge with a set of first recesses. By fittable a disk is understood that can be mounted on the drive shaft so as to rotate integrally therewith. The possibility of the first disk being made in a single piece with the drive shaft is not ruled out, if this solution is technically appropriate.

In the present context, as will be clear from what is described below, the expression drive shaft is used to indicate any shaft which transfers torque and therefore power to one or more drive wheels, and on which the parking brake can thus act to block the motion of the wheels.

Besides the first disk, the inhibitor device comprises a second disk, coaxial with the first disk and mounted so as to be able to perform angular movements with respect to the first disk about the rotation axis of the first disk. The second disk can be mounted idly with respect to the drive shaft. Furthermore, the second disk comprises a perimeter edge with a set of second recesses. Suitably, the first recesses and the second recesses have an approximately equal angular pitch. The expression approximately equal is used to indicate a pitch which allows to place the recesses of the first disk sufficiently aligned with the recesses of the second disk, in order to make the locking member mesh with the disks, by being inserted into a pair of a first and a second recess, aligned with respect to each other.

The inhibitor device further comprises a centrifugal mass adapted to rotate at the angular speed of the first disk and connected to the second disk in a manner such that, when the rotation speed of the first disk, and thus the speed of the drive shaft, is higher than a minimum speed, the centrifugal mass keeps the second disk in an angularly staggered position with respect to the first disk, so that the first recesses are angularly staggered with respect to the second recesses and hinder the meshing of the locking member.

The locking member is shaped to be inserted into the first recesses and into the second recesses, when the first recesses and the second recesses are in an angular position aligned with respect to each other. The insertion of the locking member in the first recesses and in the second recesses is hindered when the second disk is in an angularly staggered position with respect to the first disk due to the rotation speed of the inhibitor device and in particular of the centrifugal mass which rotates substantially at the same angular speed as the first disk about the axis thereof.

In advantageous embodiments, the centrifugal mass is hinged to the first disk about a pivoting axis parallel to the rotation axis of the first disk and eccentric with respect to the first disk. With this arrangement, the movement of the centrifugal mass under the effect of the centrifugal force generated by the rotation of the drive shaft and of the first disk is a rotary motion about the pivoting axis. This allows to obtain a simple and reliable mechanism for angularly staggering the first disk with respect to the second disk and therefore so as to mutually stagger the first recesses and the second recesses and hinder the application of the parking brake.

Suitably, the centrifugal mass can be pushed by a return member, for example an elastic member, toward an inoperative position, in which the first disk and the second disk are arranged with the first recesses and the second recesses aligned with respect to each other. The return member opposes the centrifugal force generated by the rotation. The minimum speed above which the inhibitor device hinders the engagement of the locking member with the recesses of the first disk and the second disk is the speed at which the centrifugal force acting on the centrifugal mass exceeds the force applied by the return member.

The centrifugal mass can be constrained to the second disk so as to cause a rotation of the second disk with respect to the first disk about the axis of the first disk, and therefore to the rotation axis of the drive shaft on which the first disk is keyed.

In order to obtain a particularly advantageous structure, the second disk can be interposed between the first disk and the centrifugal mass. The centrifugal mass can be hinged to the first disk by means of a first pin which defines the pivoting axis. If the second disk is interposed between the centrifugal mass and the first disk, the first pin may be arranged so as to pass through the second disk, for example along a through hole or recess. The hole or recess of the second disk through which the first pin extends has a size such as to allow a mutual rotation of the second disk with respect to the first disk about the axis of the first disk and the second disk, which coincide with the axis of the drive shaft on which the first disk is keyed.

The centrifugal mass can be connected to the second disk by means of a second pin, preferably approximately parallel to the first pin and spaced from the first pin. The second pin may be engaged in a hole or recess of the second disk, whose size is such that a rotation of the centrifugal mass causes a corresponding rotation of the second disk with respect to the first disk.

For example, the hole or recess in which the second pin is engaged can be formed along the edge of a central hole of the second disk, by means of which the second disk is rotatably supported on the drive shaft or directly on the first disk. The recess at which the first pin, with which the centrifugal mass is hinged to the first disk, passes, may also be formed along such edge.

For a more regular operation and to more reliably constrain the various components of the inhibitor device, according to some embodiments the centrifugal mass is further connected to the first disk by means of a coupling consisting of the second pin (with which the centrifugal mass is torsionally connected to the second disk) and a slot. To this end, the second pin extends beyond the thickness of the second disk so as to be engaged in the slot obtained in the first disk. The slot allows relative, albeit limited, rotary movements between the centrifugal mass and the first disk. In this case, the centrifugal force acting on the centrifugal mass causes the second pin to slide in the slot. Preferably, the slot can be curve-shaped with a center on the pivoting axis defined by the first pin which joins the centrifugal mass to the first disk.

According to a further aspect, a mechanical transmission for transmitting a motion from an engine to one or more drive wheels is provided, comprising a drive shaft and a parking brake as defined above, wherein the first disk of the inhibitor device of the parking brake is keyed to the drive shaft of the transmission.

Also provided is a motor vehicle comprising; a frame; an engine; at least one drive wheel connected to the engine by means of a transmission as defined above. The vehicle may advantageously be a three-wheel vehicle, with two rear drive wheels and a differential. The transmission can be arranged upstream of the differential, so that the activation of the parking brake causes the locking of the two drive wheels.

BRIEF DESCRIPTION OF THE DRAWINGS

The invention will be clearer from the description and the attached drawings, which illustrate an embodiment provided by way of non-limiting example of the invention. More particularly, in the drawings.

DETAILED DESCRIPTION

FIGS. 1 to 11 show some components for transmitting motion from an engine toward a drive wheel, or a pair of drive wheels. The transmission comprises, or is associated with, a parking brake. More particularly, the mechanical transmission 1 comprises a drive shaft 3, wherein the rotation axis is indicated with A-A. As observed above, generally, in the present context, the expression drive shaft is used to indicate a shaft which receives motion from a drive of the motor vehicle, for example an internal combustion engine or an electric motor. The drive shaft may be a shaft on which the drive wheel is directly keyed, or it can be a shaft which directly transmits the drive torque to the housing of a differential (not shown). In some embodiments, the drive shaft can transmit motion to a gear which in turn meshes with other gearwheels of a reduction gear.

In the illustrated embodiment, the drive shaft 3 is a shaft which rotates at high speed, and from which the motion is transmitted to a driven shaft 5, which in turn directly or indirectly transmits it to a drive wheel or to the housing of a differential.

The transmission may comprise a continuously variable transmission (CVT), a gearbox, or another device for changing the transmission ratio between the engine and the drive wheel or wheels. Such device is not illustrated and it is not relevant for the purposes of the present description.

In the illustrated embodiment, a gear train 7 is arranged between the drive shaft 3 and the driven shaft 5 to provide a fixed transmission ratio between the drive shaft 3 (rotating at high speed) and the driven shaft 5 (rotating at low speed). An intermediate idler shaft is indicated with 9.

Figure 1:
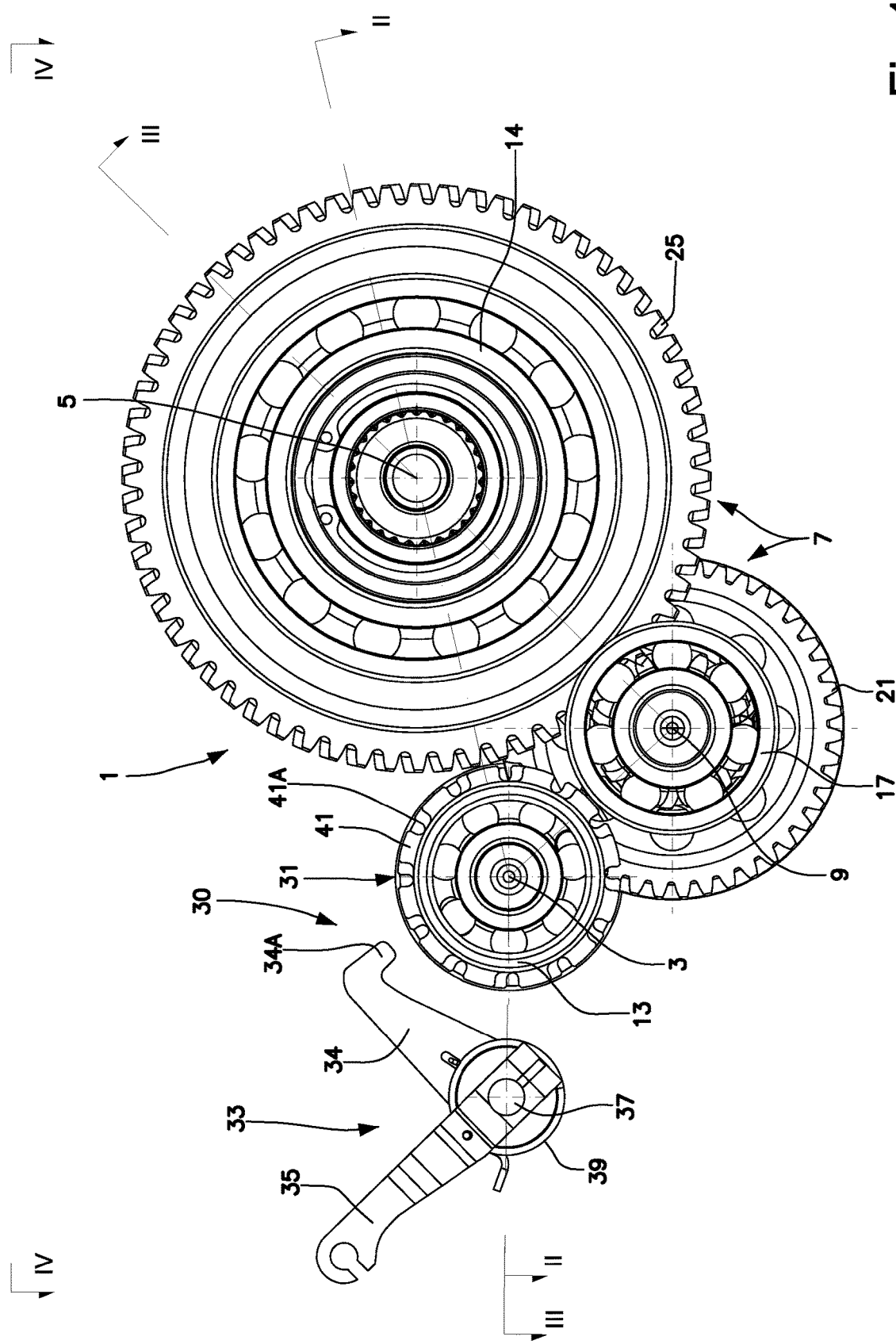
FIG. 1 is a front view, according to the line II-II of FIG. 2, of components of a mechanical transmission comprising a parking brake.
Figure 2:
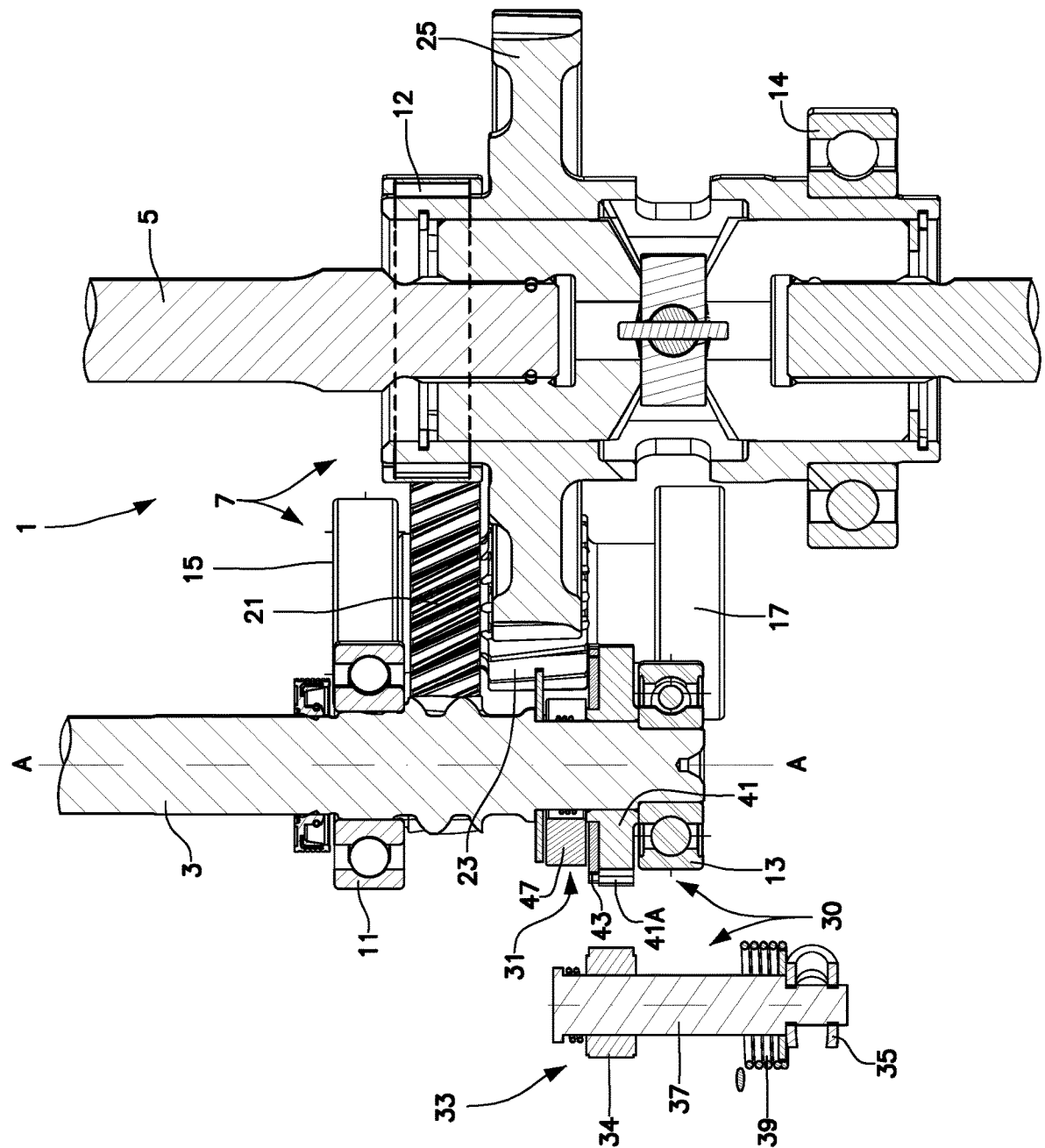
FIG. 2 is a section along the line II-II of FIG. 1.
Figure 3:
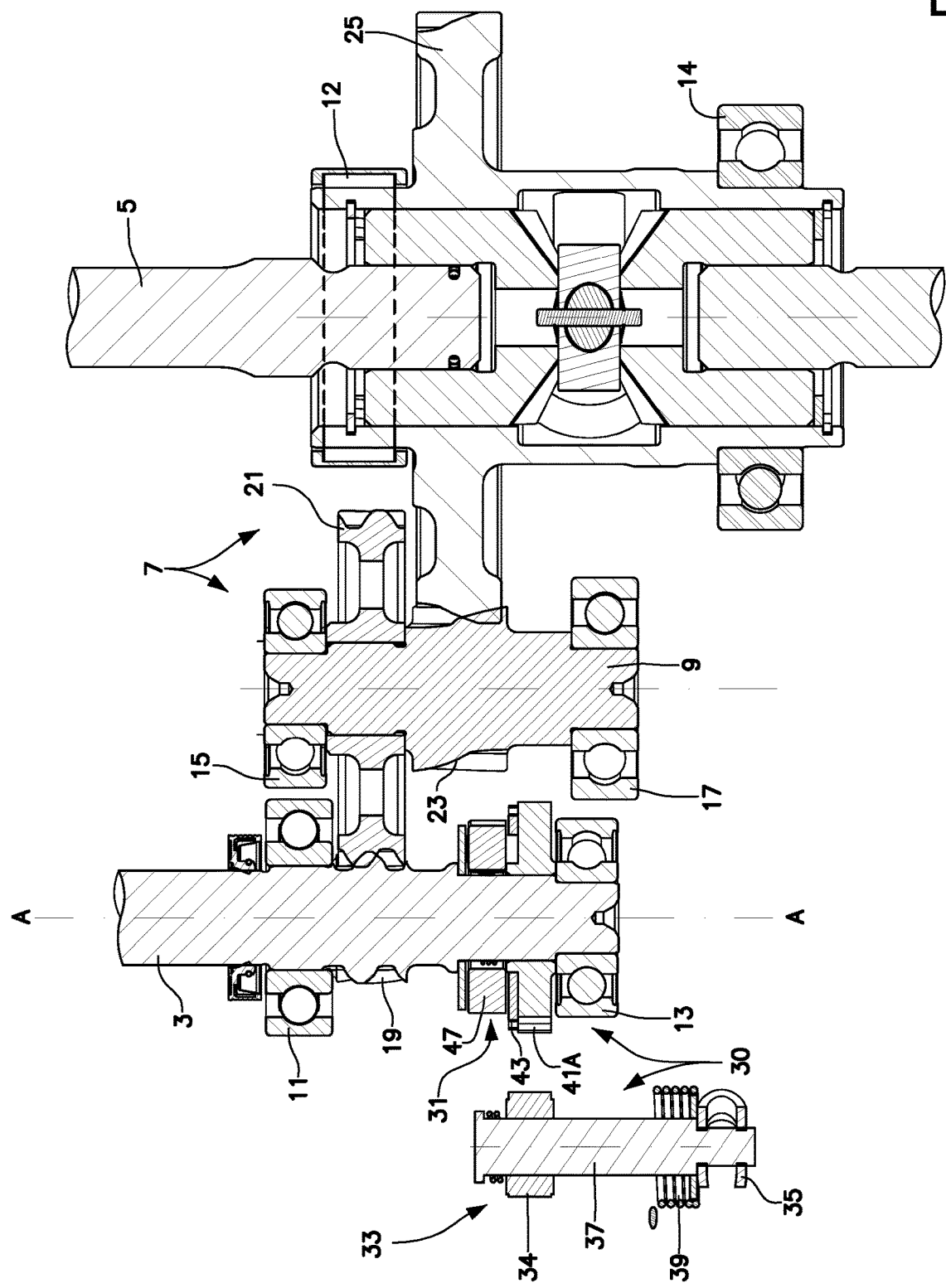
FIG. 3 is a section along the line of FIG. 1.
Figure 4:
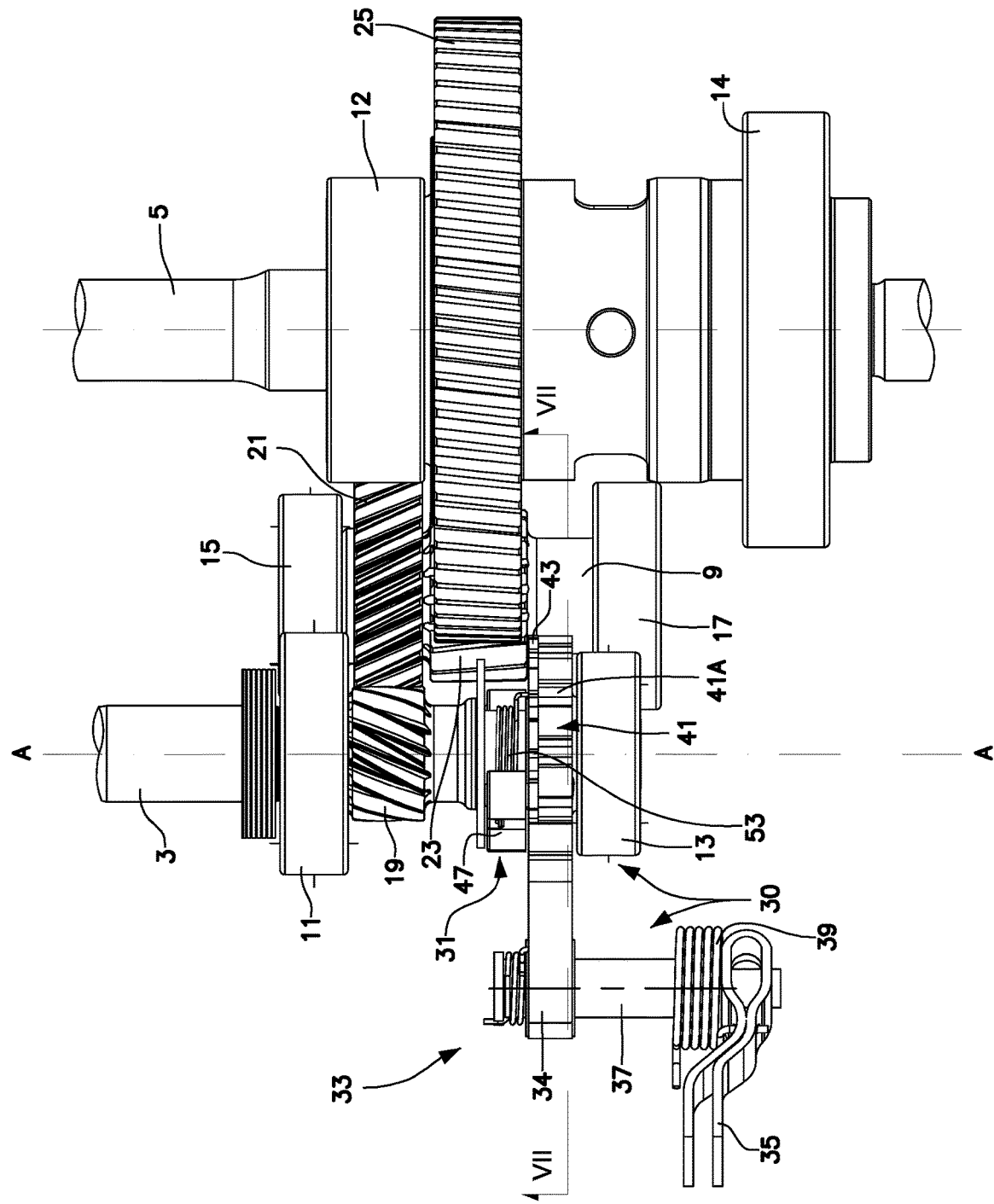
FIG. 4 is a view according to IV-IV of FIG. 1.
Figure 5:
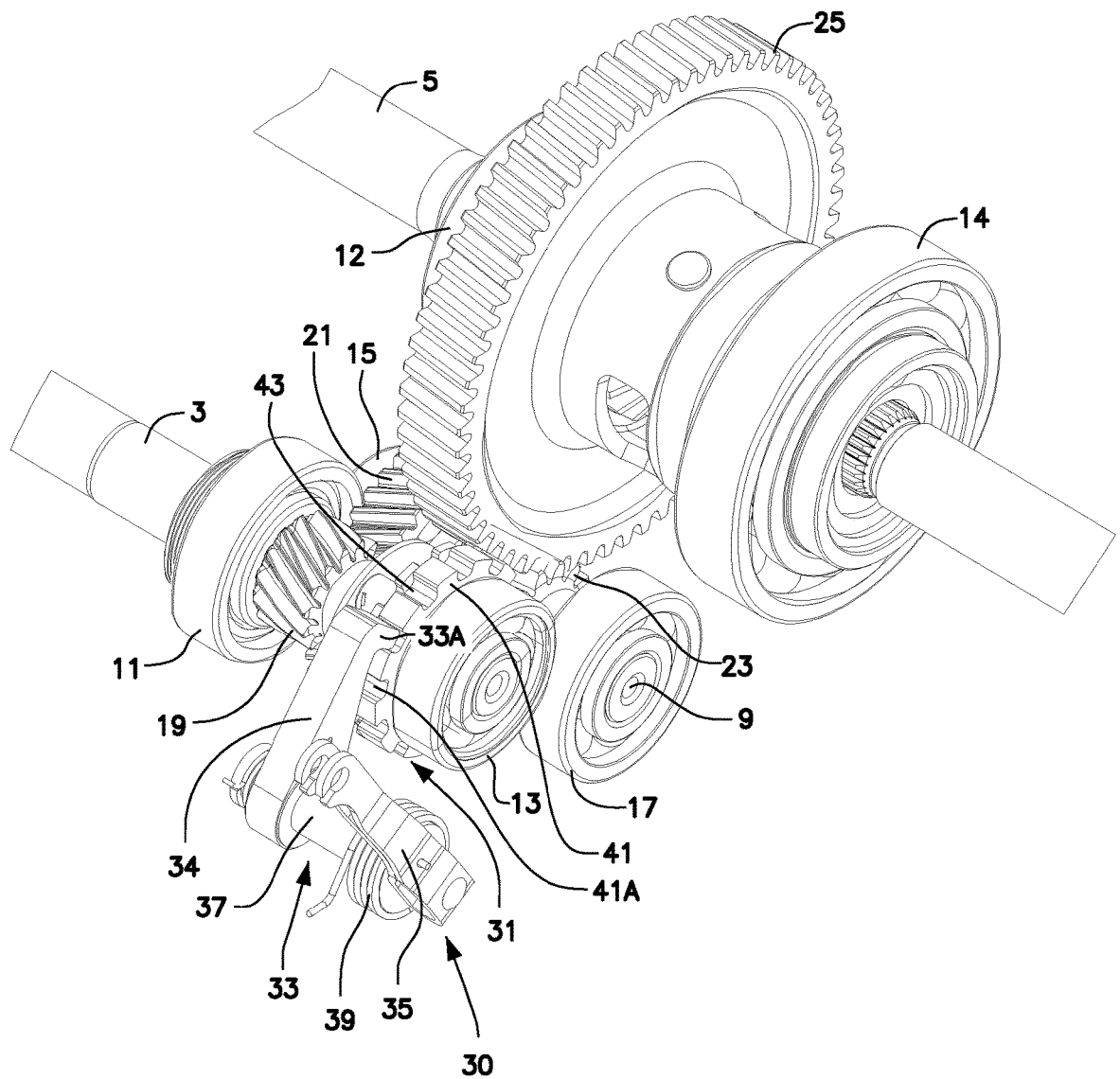
FIG. 5 is an isometric view of the components illustrated in FIGS. 1 to 5.

The gear train 7 is visible in particular in FIG. 3. With specific reference to such figure, in the illustrated embodiment the drive shaft 3 is supported by bearings 11 and 13, while the driven shaft 5 is supported by bearings 12 and 14. The intermediate shaft 9 is supported by bearings 15 and 16. Keyed on the drive shaft 3 (or made in a single piece therewith) is a gearwheel 19 which meshes with a gearwheel 21 keyed on the intermediate idler shaft 9, or it is made as a single piece therewith. A gearwheel 23 is keyed on, or is made as a single piece with, the gearwheel 9 and it meshes with a gearwheel 25 keyed on the driven shaft, or made as a single piece therewith. The gearwheel train 19, 21, 23, 25 defines a reduction ratio between the drive shaft 3 and the driven shaft 5.

Associated to the drive shaft 3 is a parking brake indicated in its entirety with reference numeral 30, which has the function of hindering the rotation of the drive shaft 3 when the vehicle is stationary. For safety reasons, the parking brake 30 is configured so that it cannot be engaged when the drive shaft 3 is rotating. More specifically, as will become apparent hereinafter, the parking brake 30 can only be engaged (i.e. applied) when the rotation speed of the drive shaft 3 is less than a minimum value. Given that the driven shaft 5, which transmits the motion to the drive wheel or drive wheels, has a rotation speed substantially lower than the rotation speed of the drive shaft 3, the minimum speed of the drive shaft 3 at which the parking brake 30 can be engaged corresponds to an even lower and almost negligible speed of the vehicle on which the transmission 1 is mounted.

The parking brake comprises an inhibitor device 31, which inhibits the application of the parking brake when the drive shaft 3 rotates at a speed higher than a minimum safety speed. The parking brake further comprises a locking member 33 which, when the rotation speed of the drive shaft 3 is lower than the minimum safety speed, engages a component of the inhibiting device 31 integrally joined with the drive shaft 3, hindering the rotation of the latter.

In the illustrated embodiment, the locking member 33 comprises a pivoting lever 34, ending with a tooth 34A. The pivoting lever 34 is integrally joined with an actuation lever 35, which can be connected, for example by means of a cable (not shown) to a manual or servo-assisted actuator. A pin 37 rigidly connects the pivoting lever 34 to the actuation lever 35. A torsional spring 37 returns the locking member 33 to the inactive position when the actuation lever 35 is not activated.

The locking against rotation of the drive shaft 3 is obtained by means of co-action between the locking member 33 and a first disk 41 keyed on the drive shaft 3. The first disk 41 has an axis coinciding with the rotation axis of the drive shaft 3.

The first disk 41 (see also FIGS. 12 to 19) is provided with first perimetric recesses 41A arranged according to a constant angular pitch about the axis A-A of the drive shaft 3. The recesses 41A have such a shape and size as to house the tooth 34A of the pivoting lever 34 of the parking brake 30.

A second disk 43 is associated with the first disk 41 and is also mounted coaxial to the drive shaft 3. While the first disk 41 is keyed on the drive shaft 3 and it rotates integrally joined therewith, the second disk 43 is idle with respect to the drive shaft 3 and with respect to the first disk 41.

The second disk 43 has a set of second perimetric recesses 43A, having the same shape and pitch as the first recesses 41A formed on the first disk 41.

The second disk 43 is mounted so as to be able to perform angular movements about the axis A-A of the drive shaft 3 and therefore to be able to move angularly with respect to the first disk 41. To this end, a rotary coupling between the second disk 43 and the drive shaft 3 or between the second disk 43 and the first disk 41, is provided. In the illustrated embodiment, the rotary coupling is obtained with a collar 41B integrally joined with the first disk 41, visible in particular in the exploded view of FIGS. 12 and 13. The second disk 43 is mounted on the collar 41B and, to this end, has a central hole 43B with a diameter approximately equal to the outer diameter of the collar 41B.

A centrifugal drive mechanism is provided to rotate the second disk 43 with respect to the first disk 41 about the axis A-A. The centrifugal drive mechanism comprises a centrifugal mass, which rotates with the drive shaft 3 and with the first disk 41. On the centrifugal mass a centrifugal force acts, which is a function of the rotation speed of the drive shaft 3. The arrangement is such that when the centrifugal force acting on the centrifugal mass exceeds a certain value (and thus when the angular speed of the drive shaft 3 exceeds a minimum value), the centrifugal mass is pushed toward a position of maximum energy, and maximum distance from the rotation axis A-A of the drive shaft. The movement of the centrifugal mass causes a mutual angular movement between the first disk 41 and the second disk 43, such as to modify the relative position between the first recesses 41A and the second recesses 43A. Greater details on the centrifugal mechanism are described hereinafter.

In the illustrated embodiment, the centrifugal mechanism comprises a centrifugal mass 47, preferably of curved shape, to which a first pin 49 and a second pin 51 are associated. In the illustrated embodiment, the centrifugal mass 47, the first disk 41 and the second disk 43 are arranged in a sequence such that, along the rotation axis of the drive shaft 3, the second disk 43 is in an intermediate position between the centrifugal mass 47 and the first disk 43.

The first pin 49 passes through the second disk 43 at a recess 43C formed along the edge of the central hole 43B and it is inserted into a circular hole 41C of the first disk 41 (see in particular FIGS. 12 and 13) forming a hinge for rotation of the centrifugal mass 47 with respect to the first disk 41.

The arrangement is such that the centrifugal mass 47 can rotate, with respect to the first disk 41 and therefore with respect to the drive shaft 3, about a pivoting axis defined by the longitudinal axis of the pin 49. Furthermore, the second disk 43 may rotate with respect to the first disk about the axis of the first disk, coinciding with the axis of the drive shaft. To this end, the recess 43C may advantageously have a dimension in a tangential direction such as to allow a rotary motion about the axis of the drive shaft, despite the presence of the pin 49.

The second pin 51 passes through the second disk 43 at a recess 43D, also formed in the edge delimiting the central hole 43B, and extends up to a slot 41D formed in the first disk 41. The slot 41D preferably has a curved shape, with a curvature having the center of curvature on the axis of the first pin 49. The dimension in the tangential direction of the recess 43D with respect to the diameter of the second pin 51 is such that a rotation of the centrifugal mass 47 about the axis of the pin 49 drives the second disk 43 in rotation with respect to the first disk 41 about the axis of the first disk 41.

The dimension of the slot 41D with respect to the diameter of the second pin 51 is such as to allow a limited rotation of the centrifugal mass 47 with respect to the first disk 41 about the axis of the first pin 49.

The centrifugal mass 47 is pushed toward an inoperative position by an elastic member 53. In the illustrated embodiment, the elastic member 53 is a helical-shaped torsional spring, which has a first curved end 53A which embraces the centrifugal mass about the second pin 51. A second end 53B of the helical spring 53 passes through the second disk 43 at a recess 43E and engages in a hole 41E of the first disk 41. The inoperative position in which the centrifugal mass 47 is elastically pushed by the spring 53 is a position of minimum distance from the axis A-A of the drive shaft 3. In this inoperative position, the centrifugal mass 47 may rest on the drive shaft 3.

When the drive shaft 3 rotates about the axis A-A thereof integrally with the first disk 41, the centrifugal mass 47 is also driven in rotation about the axis A-A due to the constraint provided by the pins 49, 51. The shape of the centrifugal mass is asymmetric with respect to the rotation axis A-A, so that, due to the rotation of the drive shaft 3, a torque, which tends to rotate the centrifugal mass 47 about the hinge formed by the first pin 49, acts on the centrifugal mass 47. The movement of the centrifugal mass 47 is guided and limited by the coupling between the slot 41D and the second pin 51. The coupling between the second pin 51 and the recess 43D causes the second disk 43 to rotate about the axis A-A with respect to the first disk 41 pushed by the centrifugal mass 47 which rotates about the pin 49. The return force generated by the spring 53 opposes the centrifugal force. When the angular speed of the drive shaft 3 drops below a minimum value, the return force of the spring 53 overcomes the centrifugal force and returns the centrifugal mass 47 to the position of minimum distance from the rotation axis A-A of the drive shaft 3.

The shape of the first disk 41 and of the second disk 43 are such that, when the centrifugal mass 47 is in the position of minimum distance from the rotation axis A-A, the first recesses 41A are aligned with the second recesses 43A. This configuration is shown in particular in FIGS. 10 and 11. In this position it is possible to activate the parking brake and to cause the insertion of the tooth 34A in the recesses 41A, 43A which are aligned with each other, i.e. to cause the engagement of the locking member 33 with the inhibitor device 31.

Vice versa, when the rotation speed of the drive shaft 3 is such that the centrifugal force acting on the centrifugal mass 47 overcomes the force of the spring 53, the two disks 41 and 43 are in an angularly staggered position, such that the recesses 41A and 43A are no longer aligned with each other. This configuration is shown in particular in FIGS. 6, 7 and 8, 9. Since the thickness of the tooth 34A, i.e. the dimension thereof in the direction of the axis A-A, and the position thereof are such that it must be inserted simultaneously in the recesses of both disks 41, 43, as shown for example in FIG. 4, when the two disks 41 and 43 are angularly staggered and the recesses 41A are not aligned with the recesses 43A, the tooth 34A cannot penetrate the recesses.

Figure 6:
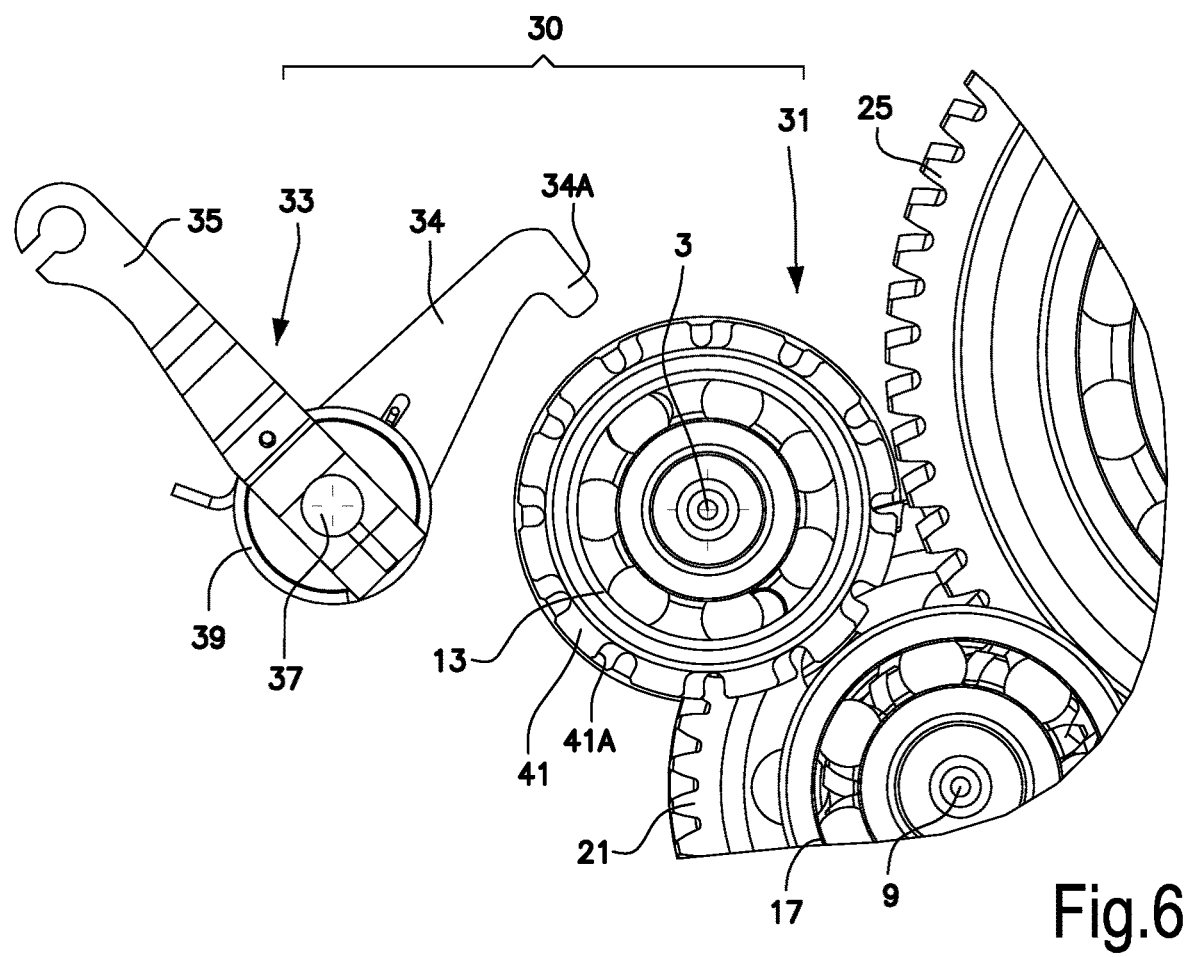
FIG. 6 is an enlargement of a detail of FIG. 1 in an operative condition.
Figure 7:
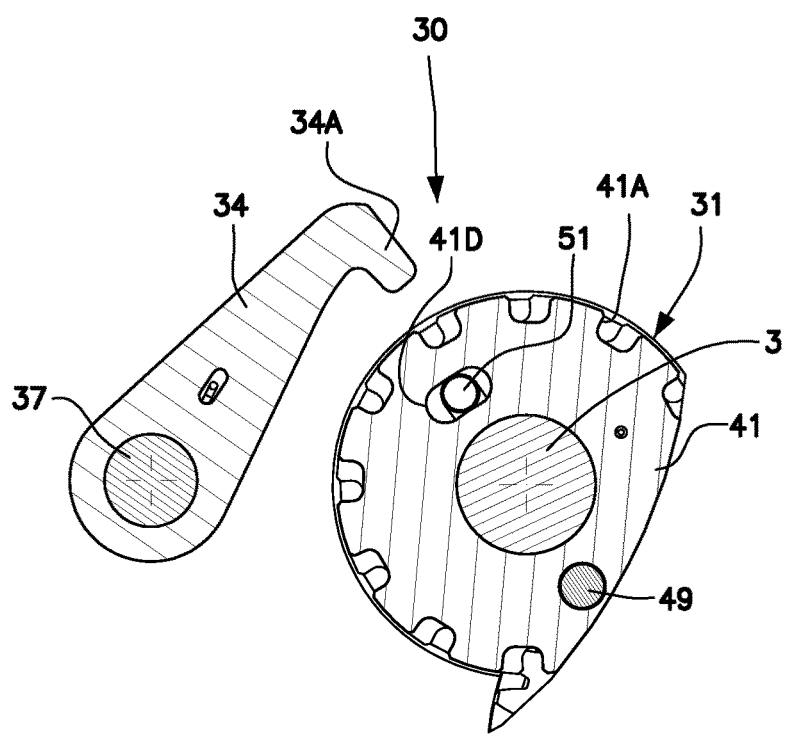
FIG. 7 is an enlargement of a section along the line VII-VII of FIG. 4.

FIGS. 6 and 7 show a condition in which the parking brake is not applied and the disks 41 and 43 are angularly staggered from each other by the centrifugal force acting on the centrifugal mass 47.

Figure 8:
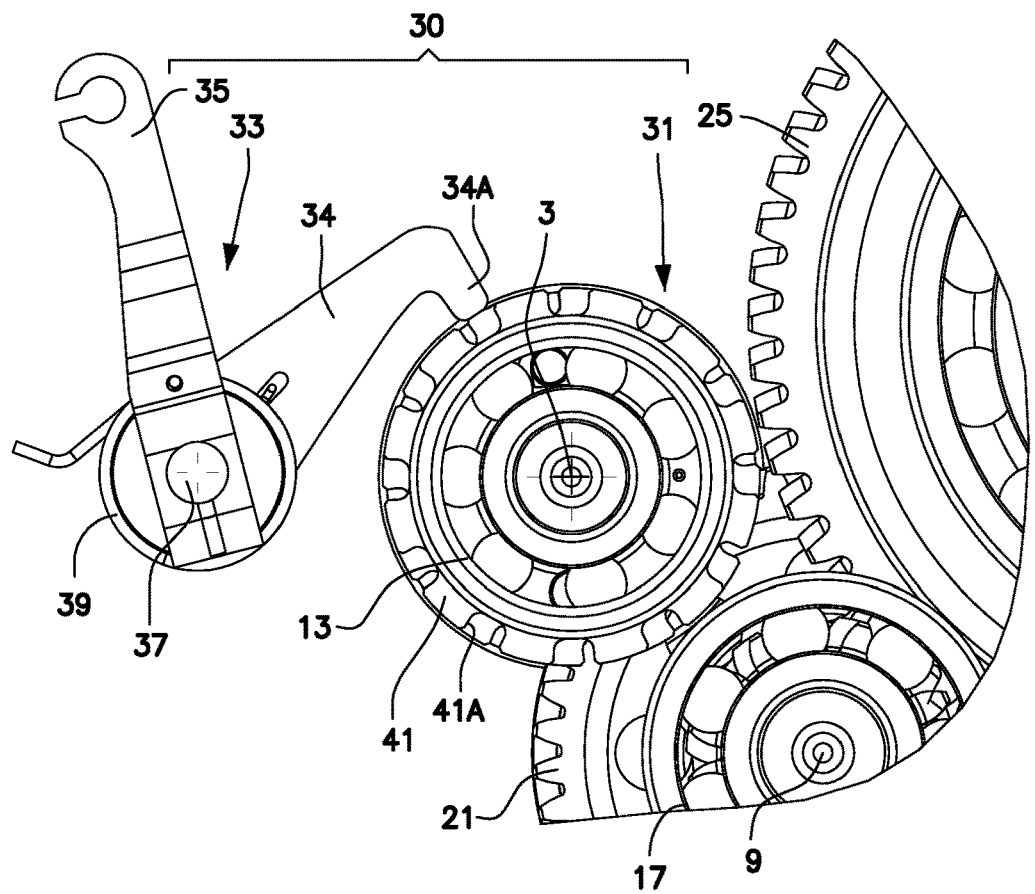
FIGS. 8 and 9 are enlargements similar to FIGS. 6 and 7 in a different operative condition.
Figure 9:
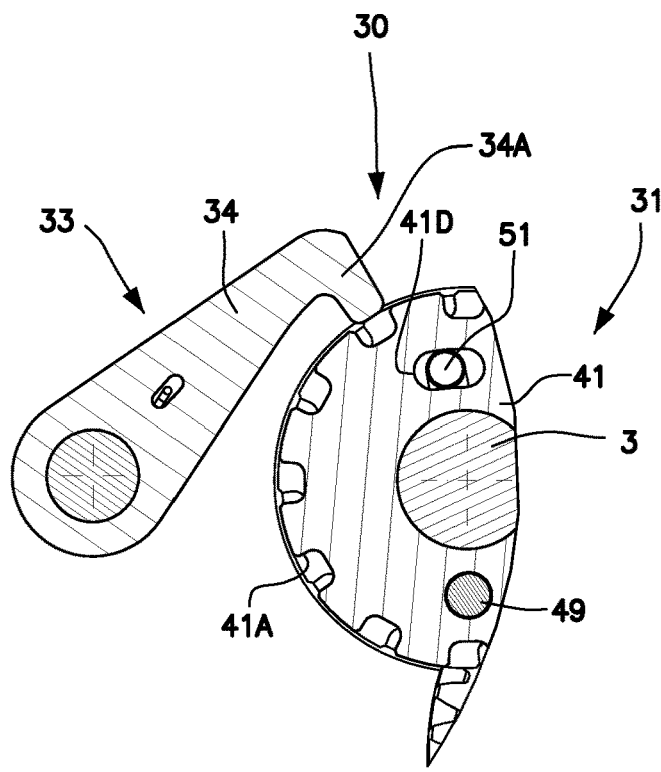
Figure 10:
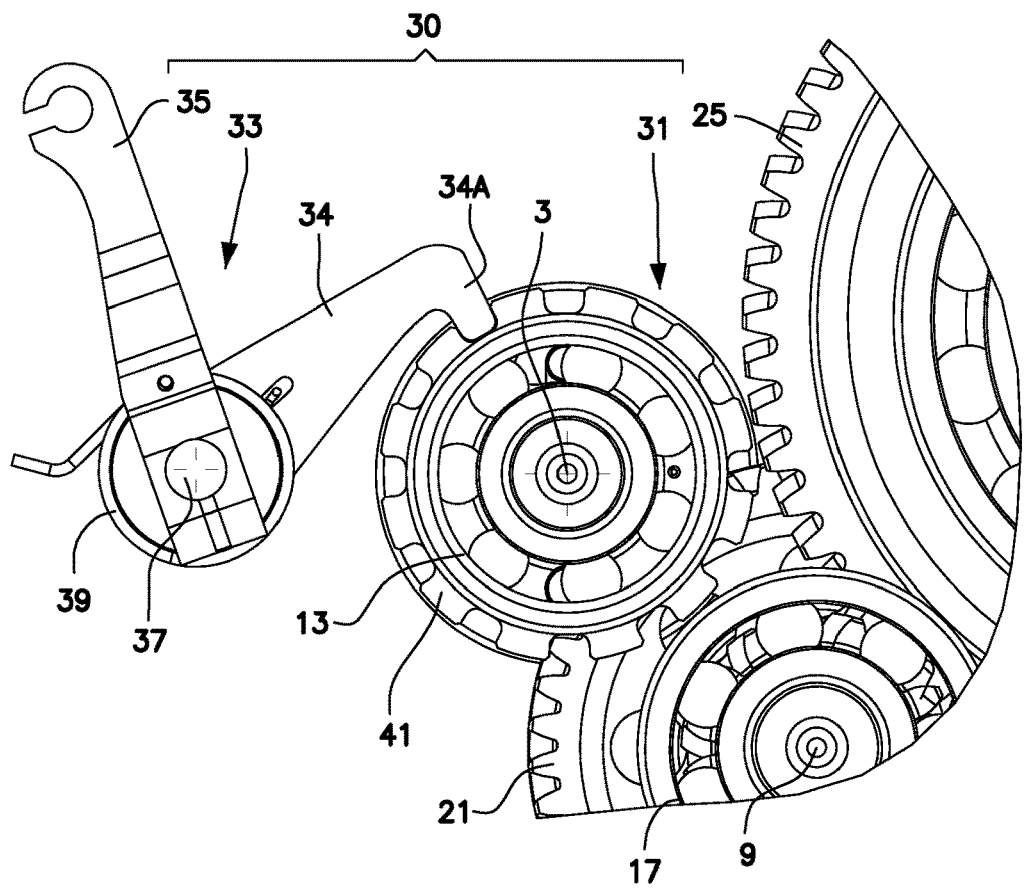
FIGS. 10 and 11 are enlargements similar to FIGS. 6 and 7 in a still different operative condition.
Figure 11:
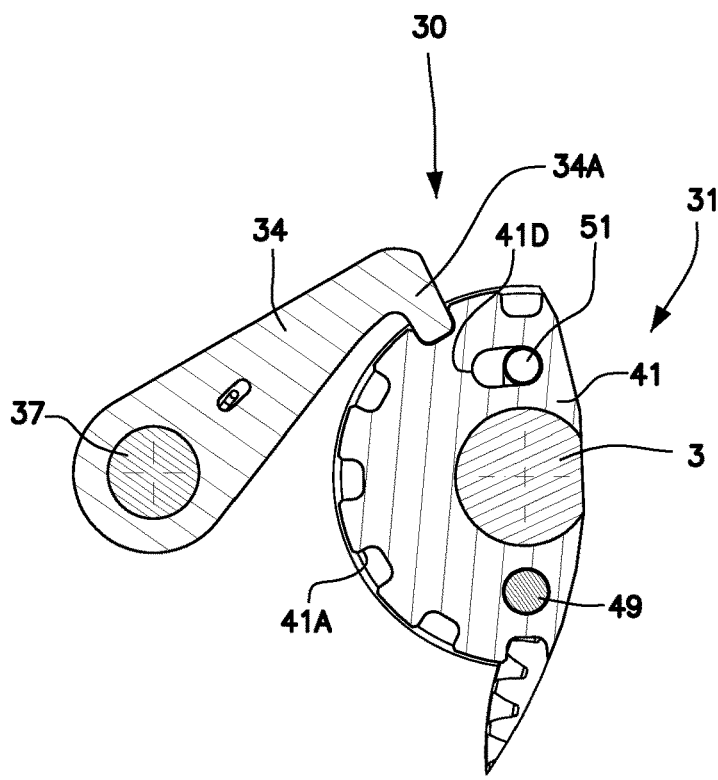
Figures 12, 13:
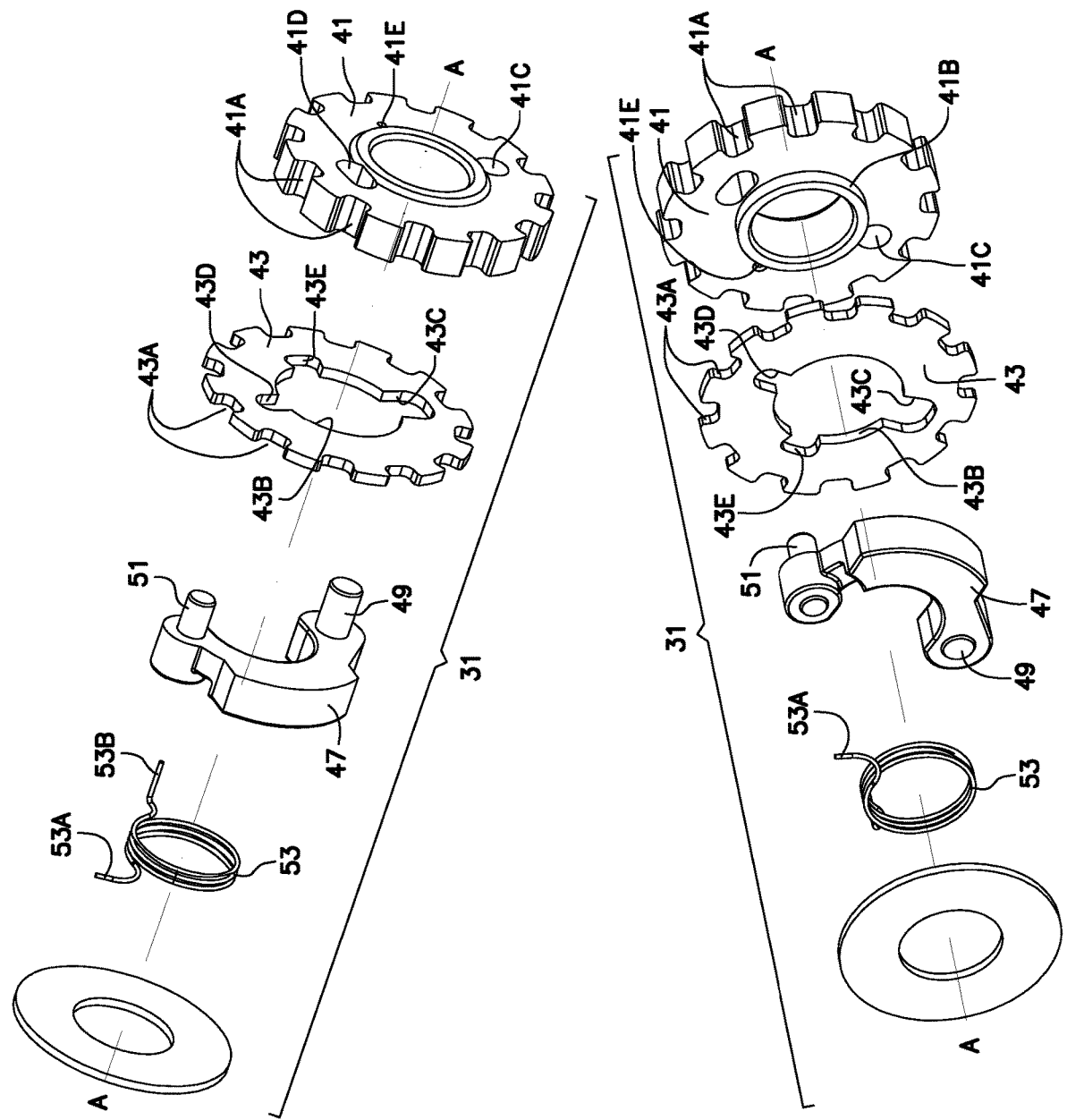
FIGS. 12 and 13 are exploded views, according to two different angles of view, of the components of the inhibitor device.
Figure 17:
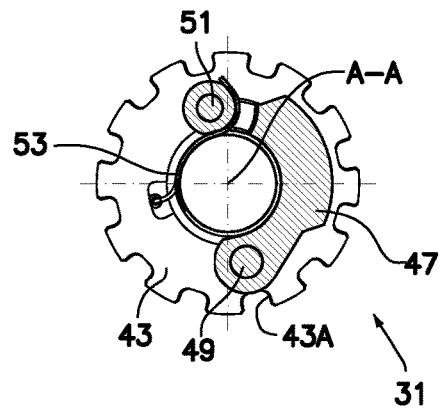
FIGS. 15, 16 and 17 are sections according to lines XV-XV, XVI-XVI and XVII-XVII of FIG. 14.
Figure 16:
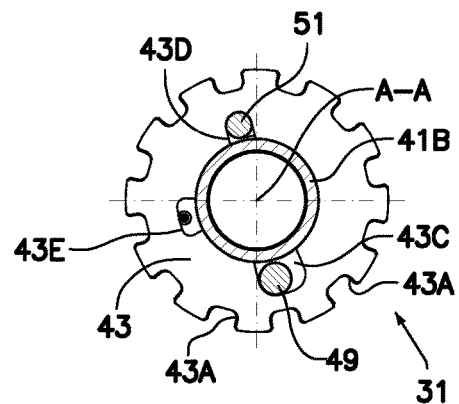
Figure 15:
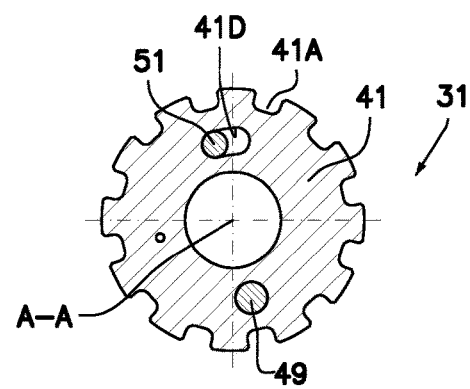
Figure 14:
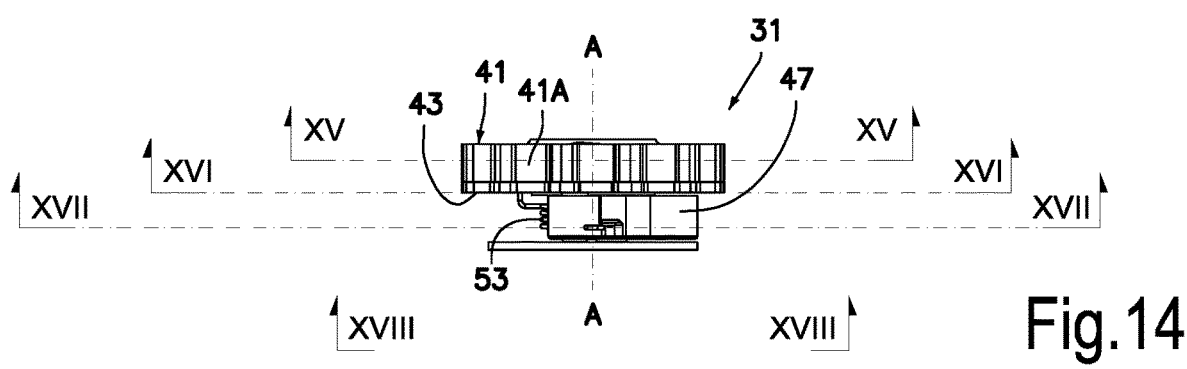
FIG. 14 is a top view of the inhibitor device isolated.
Figure 18:
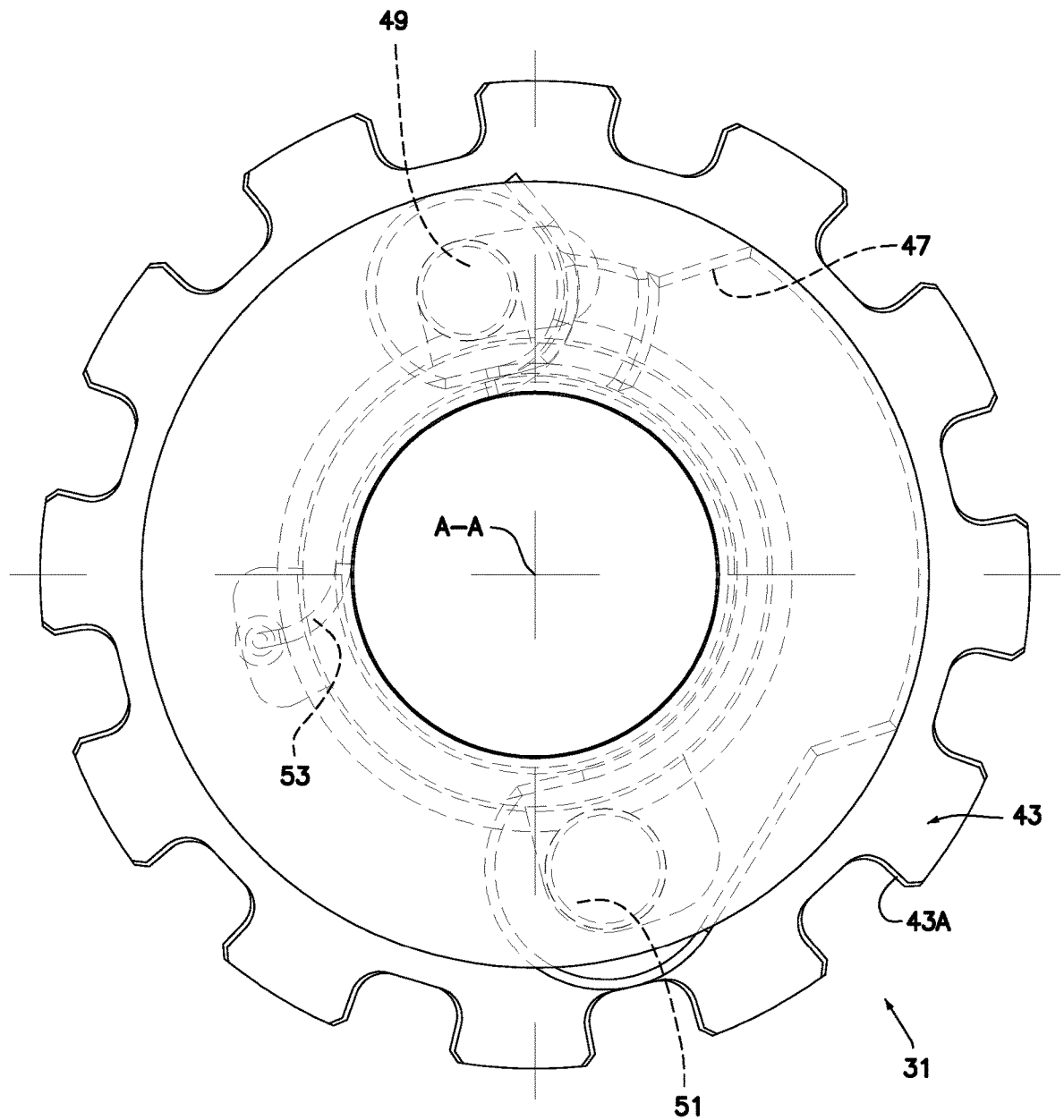
FIG. 18 is a view according to line XVIII-XVIII of FIG. 14.
Figure 19:
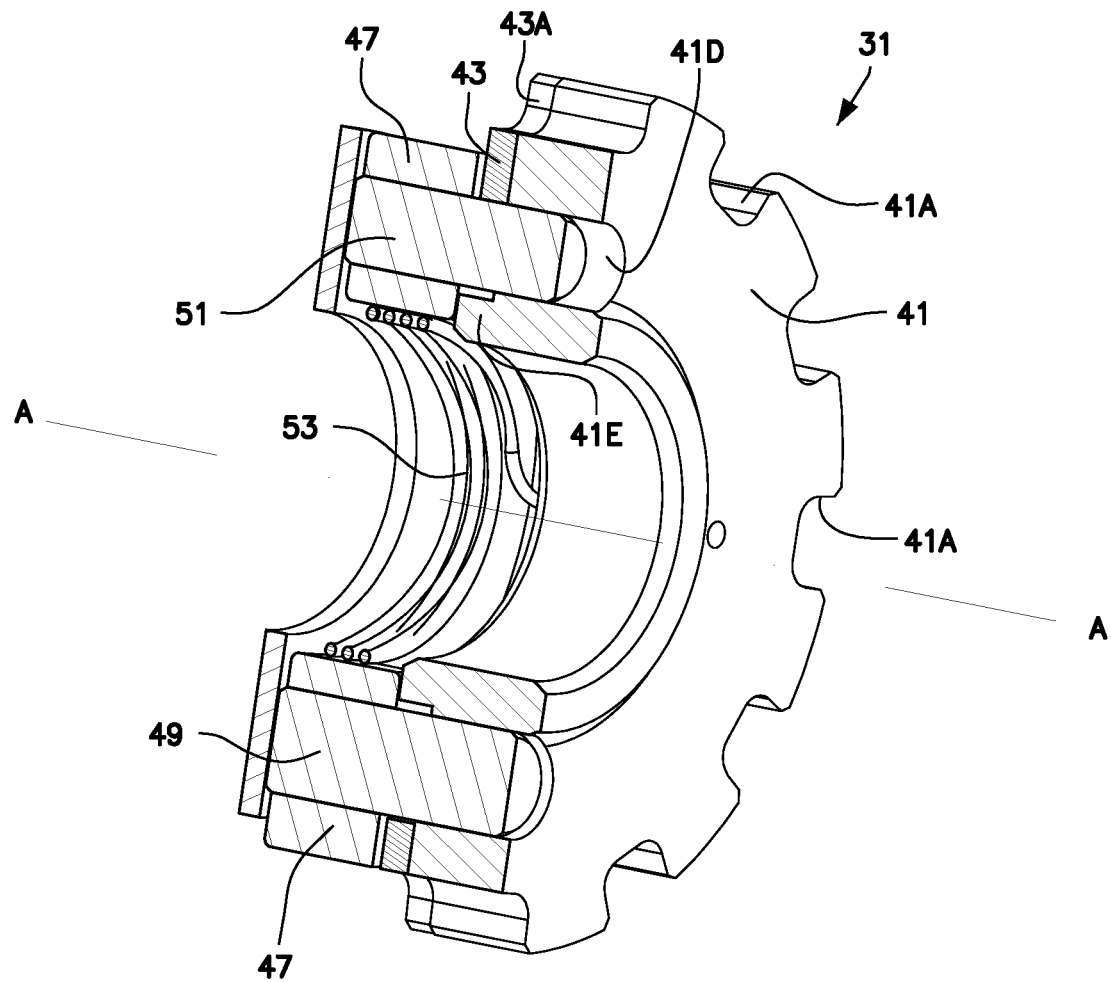
FIG. 19 is a sectional isometric view of the inhibitor device isolated.

If the parking brake is applied in the condition of FIGS. 6 and 7, with the two disks 41 and 43 angularly staggered, the parking brake cannot engage: as shown in FIGS. 7 and 8, the tooth 34A remains resting on the outer periphery of the two disks 41 and 43 being prevented from penetrating into the recesses 41A, 43A due to the mutual angular stagger of said recesses and it does not engage the inhibitor device. The drive shaft 3 remains free to rotate about the axis thereof.

Thus, this mechanism ensures that the parking brake can only be applied when the vehicle is stationary or almost stationary, using a simple, reliable and cost-effective device.

Placing the inhibitor device 31 on the drive shaft 3, which rotates at a high speed with respect to the speed of the drive wheel/s, allows to obtain a particularly sensitive device, which inhibits the activation of the parking brake even at very low vehicle speeds.

Figure 20:
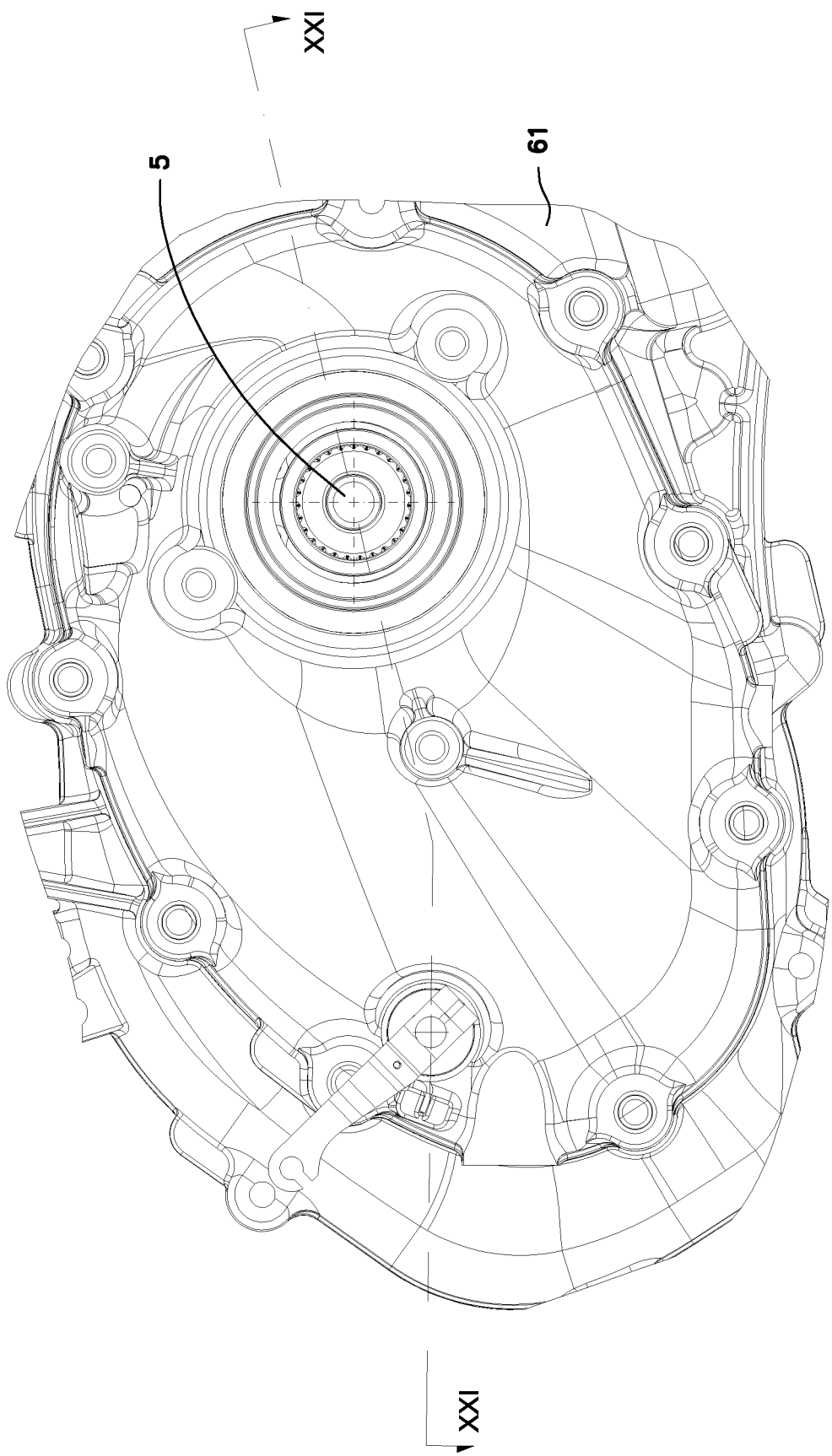
FIG. 20 is a lateral view of the guard housing the transmission.
Figure 21:
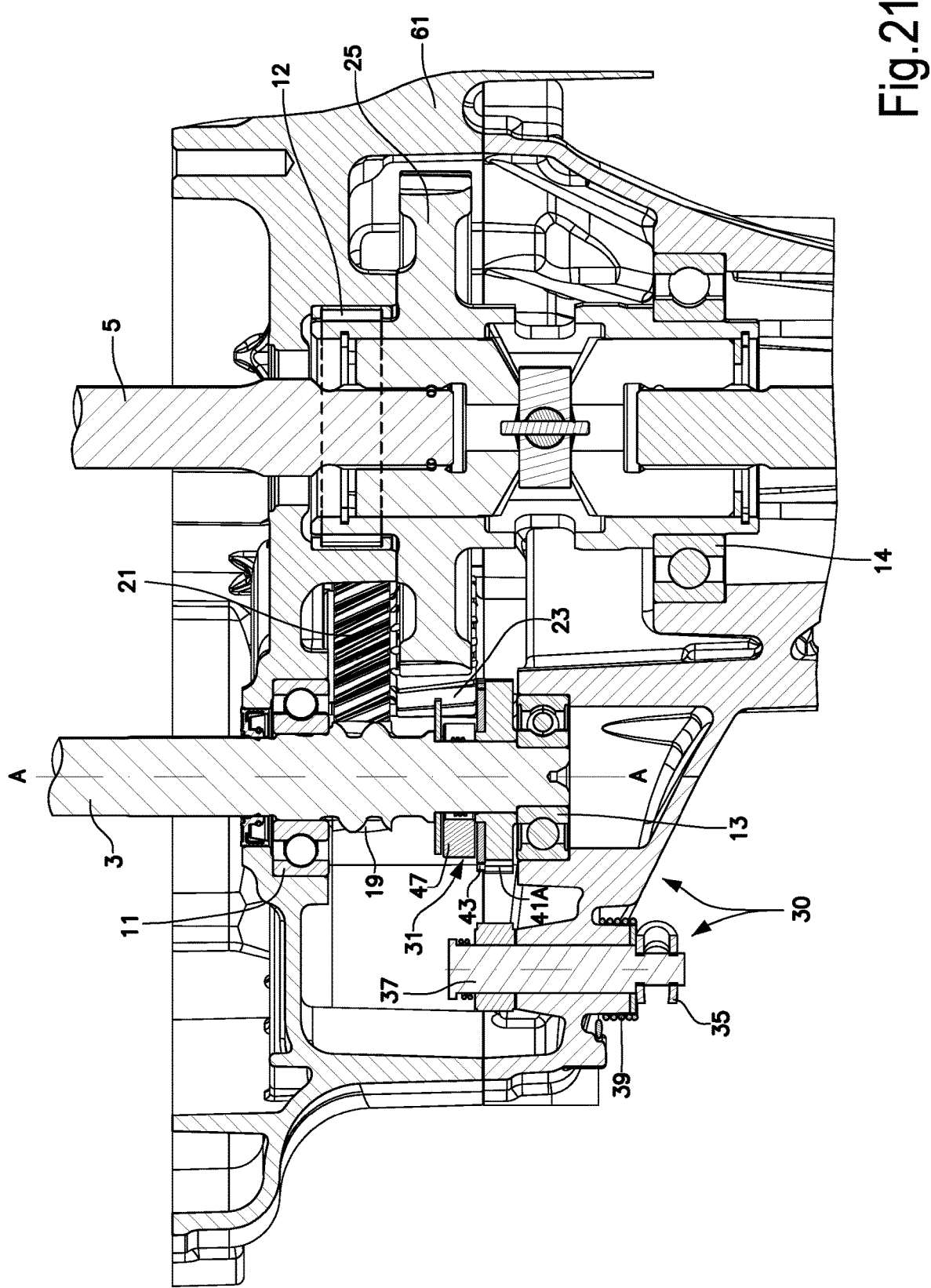
FIG. 21 is a section according to line XXI-XXI di FIG. 20.
Figure 22:
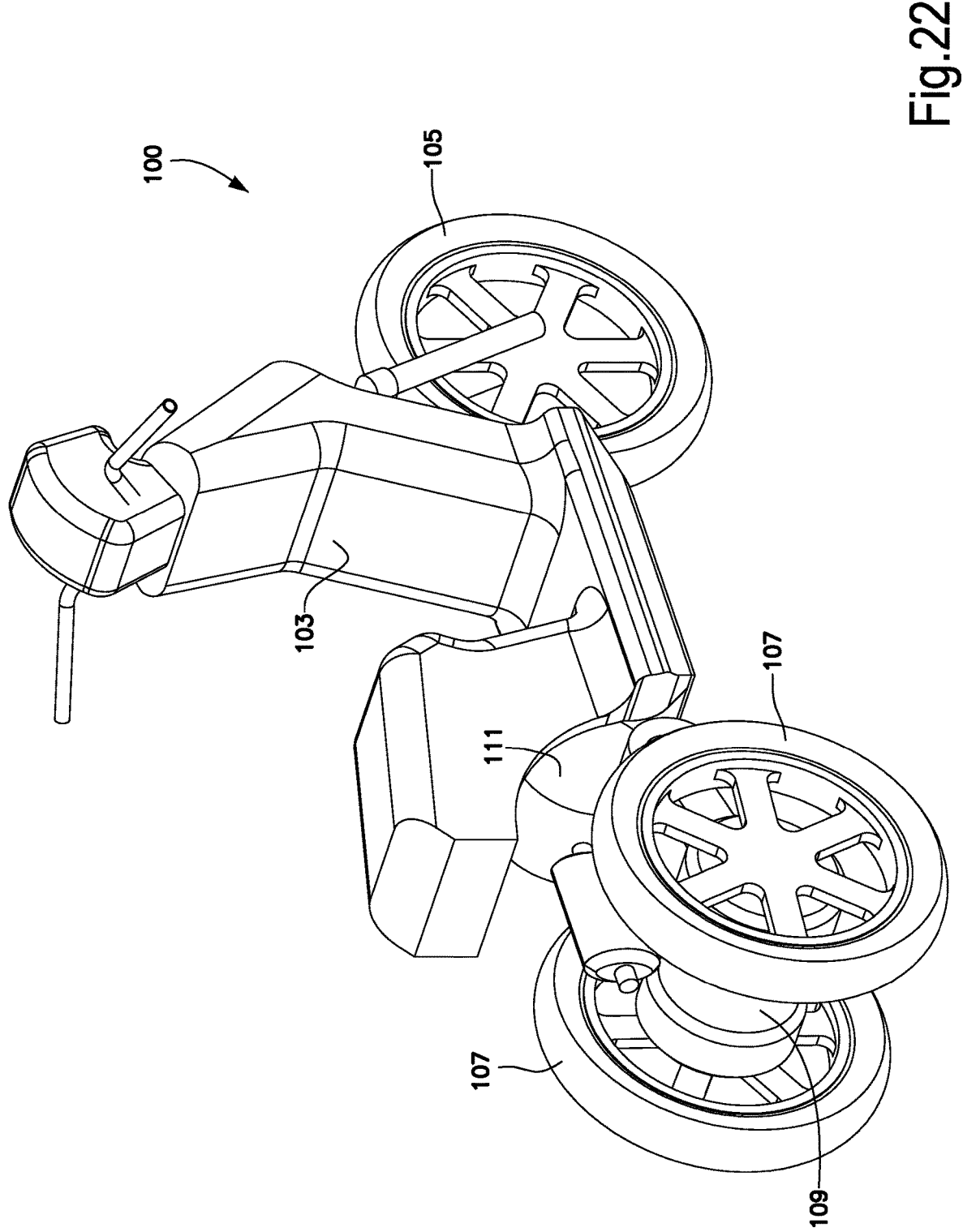
FIG. 22 is a motor vehicle on which the transmission with the parking brake of the present invention is mounted.

FIGS. 20 and 21 show the position of the members described with reference to FIGS. 1 to 19 in a guard 61 mounted on the vehicle. FIG. 22 illustrates an axonometric view of a vehicle 100 which can be equipped with the parking brake disclosed herein. The vehicle 100 comprises a frame 103, a front steered wheel 105 and a pair of rear drive wheels 107. An engine is indicated with reference numeral 111. The transmission between the engine 111. A differential, not shown, may be interposed between the engine 111 and the driving wheels 107, to which the motion is transmitted by means of the transmission of FIGS. 20 and 21, in which the parking brake is applied.

Having described an embodiment of the invention, specific features of the present invention are summarized hereinafter:

Clause 1. A parking brake for a motor-driven vehicle (100), comprising: an inhibitor device (31), which can be associated with a drive shaft (3) for rotating therewith, the inhibitor device (31) being actuated by means of centrifugal force; and a locking member (33) adapted to engage the inhibitor device (31) when actuated, the inhibitor device (31) being configured to prevent the engagement of the locking member with the inhibitor device when the inhibitor device rotates at a speed greater than a minimum speed, so as to prevent the parking brake from being applied.

Clause 2. The parking brake of clause 1, wherein the inhibitor device (31) comprises:
- a first disk (41) which can be keyed onto the drive shaft (3), having a rotation axis and comprising a perimeter edge with a set of first recesses (41A);
- a second disk (43), coaxial to the first disk (41), mounted so as to be able to perform angular movements with respect to the first disk (41) about the rotation axis of the first disk (41), and that can be mounted idle with respect to the drive shaft (3); wherein the second disk (43) comprises a perimeter edge with a set of second recesses (43A), the first recesses (41A) and the second recesses (43A) having an approximately equal angular pitch;
- a centrifugal mass (47) adapted to rotate at the angular speed of the first disk (41) and connected to the second disk (43) so that when the rotation speed of the first disk is higher than a minimum speed, the centrifugal mass holds the second disk (43) in an angularly staggered position with respect to the first disk (41), so that the first recesses (41A) are angularly staggered with respect to the second recesses (43A); wherein the locking member (33) is shaped so as to be fitted into the first recesses (41A) and into the second recesses (43A), when the first recesses and the second recesses are in an angular position phased with respect to each other; wherein the insertion of the locking member (33) in the first recesses (41A) and in the second recesses (43A) is prevented when the second disk (43) is in an angularly staggered position with respect to the first disk (41).

Clause 3. The parking brake of clause 2, wherein the centrifugal mass (47) is hinged to the first disk (41) about a pivoting axis parallel to the rotation axis of the first disk (41) and eccentric with respect to the first disk (41).

Clause 4. The parking brake of clause 3, wherein the centrifugal mass (47) is pushed by a return member (53), in particular an elastic member, toward an inoperative position, wherein the first disk (41) and the second disk (43) are arranged with the first recesses (41A) and the second recesses (43A) phased with respect to each other.

Clause 5. The parking brake of clause 3 or 4, wherein the centrifugal mass (47) is constrained to the second disk (43) so as to cause a rotation of the second disk (43) with respect to the first disk (41) about the rotation axis of the first disk, when the centrifugal mass (47) rotates about the pivoting axis.

Clause 6. The parking brake of one or more of clauses 3 to 5, wherein the centrifugal mass (47) has a mass distribution that is asymmetric with respect to the axis of the first disk (41), such that a rotation of the first disk (41) and of the centrifugal mass (47) generates on the centrifugal mass a centrifugal force which pushes the centrifugal mass (47) to rotate about the pivoting axis moving away from the axis of the first disk (41).

Clause 7. The parking brake of one or more of clauses 3 to 6, wherein the second disk (43) is interposed between the first disk (41) and the centrifugal mass (47).

Clause 8. The parking brake of one or more of clauses 3 to 7, in which the centrifugal mass (47) is hinged to the first disk (41) by means of a first pin (49) defining the pivoting axis.

Clause 9. The parking brake of clause 8, wherein the centrifugal mass (47) is constrained to the second disk (43) by means of a second pin (51), preferably approximately parallel to the first pin (49) and spaced from the first pin.

Clause 10. The parking brake of clause 9, wherein the centrifugal mass (47) is further constrained to the first disk (41) by means of a coupling which limits the mutual angular staggering between the first disk (41) and the second disk (43).

Clause 11. The parking brake of the clause 10, in which the coupling between the centrifugal mass (47) and the first disk (41) comprises the pin (51) and a slot (41D), in which the second pin (51) is slidably engaged, the centrifugal force acting on the centrifugal mass (47) causing the second pin (51) to slide in the slot (41D); wherein the slot preferably has a curved shape with a center on the pivoting axis.

Clause 12. The parking brake of one or more of clauses 11, wherein the slot (41D) is formed in the first disk (41) and the second pin (51) is integrally joined with the centrifugal mass (47).

Clause 13. The parking brake of one or more of clauses 9 to 12, wherein the first pin (49) and the second pin (51) are in opposite positions with respect to the rotation axis of the first disk (41).

Clause 14. The parking brake of one or more of clauses 9 to 13, wherein the first pin (49) and the second pin (51) pass through the second disk (43).

Clause 15. The parking brake of one or more of the preceding clauses, in which the locking member (33) comprises a pivoting lever (34) controlled by a locking actuator.

Clause 16. A mechanical transmission (1) for transmitting a motion from an engine (111) to one or more drive wheels (107), comprising a drive shaft (3) and a parking brake according to one or more of the preceding clauses and a gear train, wherein the first disk (41) of the inhibitor device of the parking brake is keyed to the drive shaft (3) of the transmission (1).

Clause 17. A motor vehicle (100) comprising; a frame (103); an engine (111); at least one drive wheel (107) connected to the engine by means of a transmission according to clause 16.

Clause 18. A parking brake for a motor-driven vehicle (100), comprising:
- an inhibitor device (31), which can be associated with a drive shaft (3) for rotating therewith, the inhibitor device (31) being actuated by means of centrifugal force; and
- a locking member (33) suitable to engage the inhibitor device (31);
- wherein the inhibitor device (31) is configured to pass from:

a first angular position in which it prevents the engagement of the locking member (33) when said drive shaft (3) rotates at a rotation speed greater than a minimum speed, to a second angular position in which it allows the engagement of the locking member (33) when said drive shaft (3) rotates at a rotation speed lower than said minimum speed; and wherein said inhibitor device (31) is actuated by means of a centrifugal force, correlated to said rotation speed.

Clause 19. The parking brake of the clause 18, wherein the inhibitor device (31) comprises a first disk (31) and a second disk (43) coaxial with each other; an elastic member which pushes the first disk and the second disk into the second reciprocal angular position; a centrifugal mass on which, when the inhibitor is rotating, a centrifugal force acts which pushes the first disk and the second disk to the first mutual angular position.

The invention claimed is:

1. A parking brake for a motor-driven vehicle, the parking brake comprising:
   an inhibitor device, adapted to be associated to a drive shaft for rotating therewith, the inhibitor device being actuated by means of centrifugal force; and
   a locking member adapted to engage the inhibitor device;
   wherein the inhibitor device is configured to move from:
      a first angular position in which the inhibitor device prevents the engagement of the locking member when said drive shaft rotates at a rotation speed greater than a minimum speed,
      to a second angular position in which the inhibitor device allows the engagement of the locking member when said drive shaft rotates at a rotation speed lower than said minimum speed; and
   wherein said inhibitor device is actuated by means of a centrifugal force, correlated to said rotation speed.

2. The parking brake of claim 1, wherein the inhibitor device comprises:
   (a) a first disk adapted to be keyed onto the drive shaft, having a rotation axis and comprising a perimeter edge with a set of first recesses,
   (b) a second disk, coaxial to the first disk, mounted so as to be able to perform angular movements with respect to the first disk about the rotation axis of the first disk, and that can be mounted idle with respect to the drive shaft; wherein the second disk comprises a perimeter edge with a set of second recesses, the first recesses and the second recesses having an approximately equal angular pitch; and
   (c) a centrifugal mass adapted to rotate at the angular speed of the first disk and connected to the second disk so that when the rotation speed of the first disk is higher than a minimum speed, the centrifugal mass holds the second disk in an angularly staggered position with respect to the first disk, so that the first recesses are angularly staggered with respect to the second recesses, wherein the locking member is shaped so as to be fitted into the first recesses and into the second recesses, when the first recesses and the second recesses are in an angular position phased with respect to each other; wherein the insertion of the locking member in the first recesses and in the second recesses is prevented when the second disk is in an angularly staggered position with respect to the first disk.

3. The parking brake of claim 2, wherein the centrifugal mass is hinged to the first disk about a pivoting axis parallel to the rotation axis of the first disk and eccentric with respect to the first disk.

4. The parking brake of claim 3, wherein the centrifugal mass is pushed by a return member, comprises of an elastic member, toward an inoperative position, in which the first disk and the second disk are arranged with the first recesses and the second recesses phased with respect to each other.

5. The parking brake of claim 3, wherein the centrifugal mass is constrained to the second disk so as to cause a rotation of the second disk with respect to the first disk about the rotation axis of the first disk, when the centrifugal mass rotates about the pivoting axis.

6. The parking brake of claim 3, wherein the centrifugal mass has an asymmetric mass distribution with respect to the axis of the first disk, so that a rotation of the first disk and of the centrifugal mass generates on the centrifugal mass a centrifugal force which drives the centrifugal mass in rotation about the pivoting axis moving away from the axis of the first disk.

7. The parking brake of claim 3, wherein the second disk is interposed between the first disk and the centrifugal mass.

8. The parking brake of claim 3, wherein the centrifugal mass is hinged to the first disk by means of a first pin defining the pivoting axis.

9. The parking brake of claim 8, wherein the centrifugal mass is constrained to the second disk by means of a second pin spaced from the first pin.

10. The parking brake of claim 9, wherein the centrifugal mass is further constrained to the first disk by means of a coupling which limits a mutual angular staggering between the first disk and the second disk.

11. The parking brake of claim 10, wherein the coupling between the centrifugal mass and the first disk comprises the pin and a slot, wherein the second pin is slidably engaged, the centrifugal force acting on the centrifugal mass causing the second pin to slide in the slot, wherein preferably the slot has a curved shape with center on the pivoting axis.

12. The parking brake of claim 11, wherein the slot is formed in the first disk and the second pin is integrally joined with the centrifugal mass.

13. The parking brake of claim 9, wherein the first pin and the second pin are in opposite positions with respect to the rotation axis of the first disk.

14. The parking brake of claim 9, wherein the first pin and the second pin pass through the second disk.

15. The parking brake of claim 1, wherein the locking member comprises a pivoting lever controlled by a locking actuator.

16. A mechanical transmission for transmitting motion from an engine to one or more drive wheels, the mechanical transmission comprising a drive shaft and a parking brake according to claim 1 and a gear train, wherein a first disk of the parking brake inhibitor device is keyed onto the drive shaft of the transmission.

17. A motor vehicle comprising: a frame; an engine, at least one drive wheel connected to the engine by means of a transmission according to claim 16.

* * * * *